United States Patent
Okuyama et al.

(10) Patent No.: US 9,126,619 B2
(45) Date of Patent: Sep. 8, 2015

(54) VEHICLE OPERATION DEVICE

(75) Inventors: Haruko Okuyama, Utsunomiya (JP); Takeyuki Suzuki, Utsunomiya (JP)

(73) Assignee: HONDA MOTOR CO., LTD., Tokyo (JP)

(*) Notice: Subject to any disclaimer, the term of this patent is extended or adjusted under 35 U.S.C. 154(b) by 10 days.

(21) Appl. No.: 14/118,273

(22) PCT Filed: Feb. 13, 2012

(86) PCT No.: PCT/JP2012/053284
§ 371 (c)(1),
(2), (4) Date: Nov. 18, 2013

(87) PCT Pub. No.: WO2012/169229
PCT Pub. Date: Dec. 13, 2012

(65) Prior Publication Data
US 2014/0090505 A1 Apr. 3, 2014

(30) Foreign Application Priority Data
Jun. 9, 2011 (JP) ................................. 2011-129276

(51) Int. Cl.
| | |
|---|---|
| B60K 35/00 | (2006.01) |
| B60Q 1/00 | (2006.01) |
| B60Q 9/00 | (2006.01) |
| B62D 1/04 | (2006.01) |
| G06F 3/02 | (2006.01) |
| G06F 3/038 | (2013.01) |

(Continued)

(52) U.S. Cl.
CPC .............. *B62D 1/046* (2013.01); *G06F 3/0219* (2013.01); *G06F 3/038* (2013.01); *G06F 3/03547* (2013.01); *G06F 3/0416* (2013.01); *G06F 3/0488* (2013.01); *B60K 2350/1024* (2013.01); *B60K 2350/928* (2013.01); *Y10T 74/20262* (2015.01)

(58) Field of Classification Search
USPC ........................... 340/438; 345/173; 280/731
See application file for complete search history.

(56) References Cited

U.S. PATENT DOCUMENTS

| | | | |
|---|---|---|---|
| 2002/0135163 A1* | 9/2002 | Derrick ........................ | 280/731 |
| 2007/0120830 A1 | 5/2007 | Kammerer | |

(Continued)

FOREIGN PATENT DOCUMENTS

| | | |
|---|---|---|
| DE | 10214606 | 10/2003 |
| JP | 06-171516 | 6/1994 |

(Continued)

OTHER PUBLICATIONS

European Search Report dated Jun. 4, 2014, 7 pages.

*Primary Examiner* — Jack K Wang
(74) *Attorney, Agent, or Firm* — Rankin, Hill & Clark LLP

(57) ABSTRACT

An operation unit provided on a grip part of a steering wheel, and having an operation panel in which contact operations are possible by the fingers of an operator; an operation detection unit that detects contact operations with respect to the operation panel with a predetermined coordinate system as a reference; a display control unit that controls the display of a display device according to the contact operations detected by the operation detection unit; a correction unit that corrects a coordinate system according to a steering angle detected by a steering angle detection device; and a correction prohibition device that, based on at least one from among contact operations detected by the operation detection device, a steering angle detected by a steering angle sensor, and a speed detected by a speed sensor, prohibits correction of the coordinate system by the correction unit.

7 Claims, 16 Drawing Sheets

(51) Int. Cl.
  *G06F 3/0354* (2013.01)
  *G06F 3/0488* (2013.01)
  *G06F 3/041* (2006.01)

(56) References Cited

U.S. PATENT DOCUMENTS

2012/0267221 A1* 10/2012 Gohng et al. .............. 200/61.54
2012/0290184 A1* 11/2012 Suzuki ........................... 701/93
2013/0151066 A1*  6/2013 Koukes et al. ............... 701/34.4

FOREIGN PATENT DOCUMENTS

| JP | 2001-160336 | 6/2001 |
| JP | 2003-531046 | 10/2003 |
| JP | 2006-264615 | 10/2006 |
| JP | 2007-535019 | 11/2007 |
| WO | 01/58713 | 8/2001 |
| WO | 01/60650 | 8/2001 |
| WO | 03/037697 | 5/2003 |

* cited by examiner

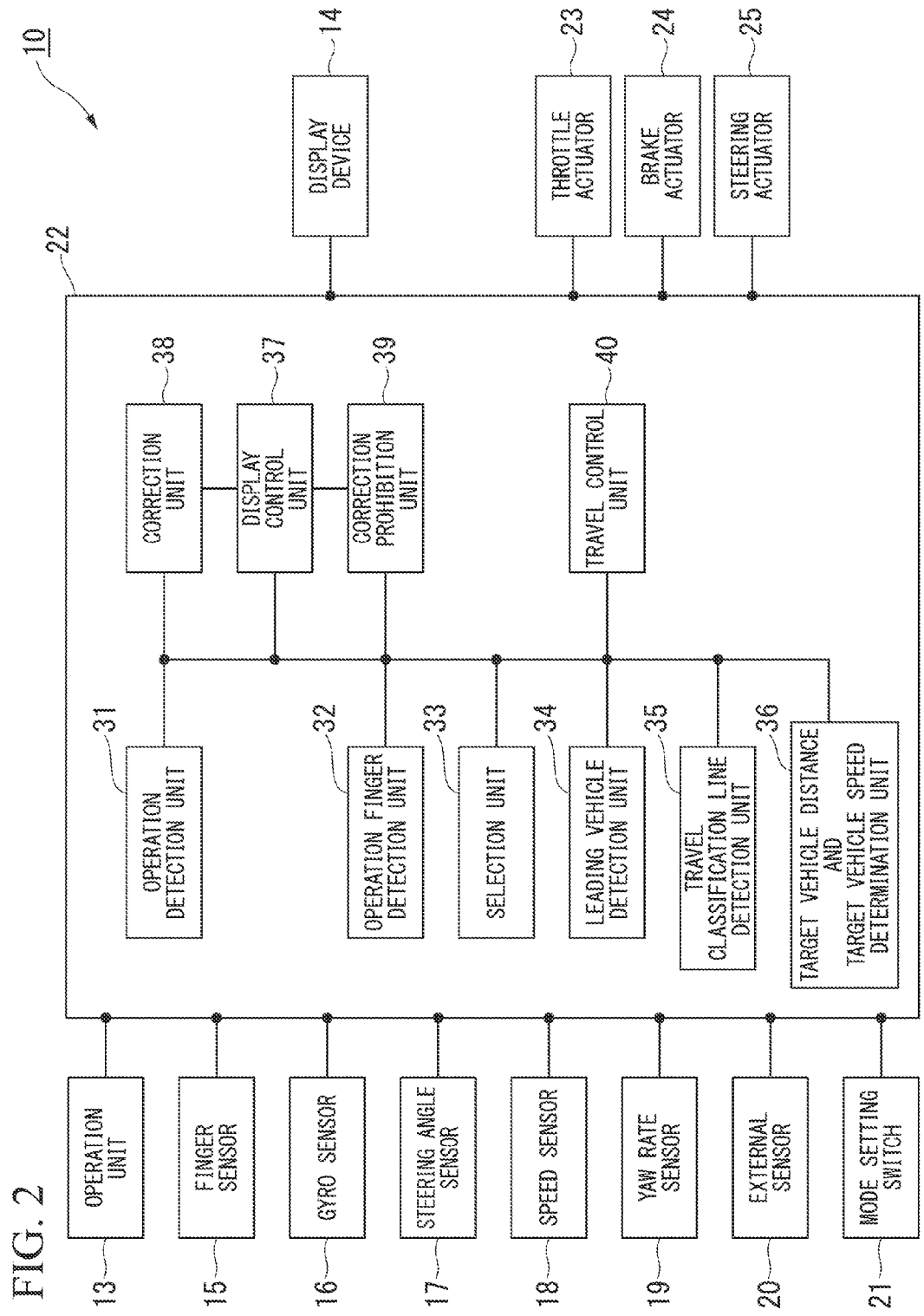

VEHICLE OPERATION DEVICE

TECHNICAL FIELD

This invention relates to a vehicle operation device.

Priority is claimed on Japanese Patent Application No. 2011-129276, filed Jun. 9, 2011, the content of which is incorporated herein by reference.

BACKGROUND ART

Heretofore there is known for example an input device in which a touch pad is rotatably provided on a steering wheel of a vehicle, and that corrects the operation direction by an operator with respect to the touch pad according to the steering of the steering wheel (refer to Patent Document 1 for example).

Furthermore, heretofore there is known for example an input device in which an operation switch provided on a steering wheel of a vehicle is made active for operation during low-speed travel of the vehicle, and that corrects the operation direction by an operator with respect to the operation switch according to the steering of the steering wheel (refer to Patent Document 2 for example).

Moreover, heretofore there is known for example an operation device in which a switch is rotatably provided on a steering wheel of a vehicle, and that makes the angle of the switch with respect to the hands or the fingers of a driver adjustable, and exchanges or modifies the functionality of the switch according to the steering of the steering wheel (refer to Patent Document 3 for example).

PRIOR ART DOCUMENTS

Patent Documents

[Patent Document 1] Published Japanese translation No. 2007-535019 of PCT International Publication
[Patent Document 2] Japanese Unexamined Patent Application, First Publication No. 2001-160336
[Patent Document 3] Published Japanese translation No. 2003-531046 of PCT International Publication

SUMMARY OF INVENTION

Problems to be Solved by the Invention

Incidentally, in the input devices according to the above conventional techniques, the operation direction is just simply corrected according to the steering of the steering wheel. Therefore for example, for specific operation methods or operation situations, there is concern that an inappropriate correction that is not intended by the operator may be performed.

Furthermore, in the operation device according to the above conventional technique, in a case where the point of making the switch rotatable is applied to, for example, a pointing device, a touch pad, and the like, the movement distance of the fingers and the angle of the hands at the time of input become restricted at the time the operator performs an input while still gripping the steering wheel. Therefore there is concern that the movement of the fingers may deviate from the intention of the operator during input, with respect to a coordinate system that is made a reference with respect to the detection of the input operation.

The present invention takes into consideration the above circumstances, with an object of providing a vehicle operation device that is capable of performing an appropriate display according to operations with respect to an operation panel provided on a steering wheel.

Means for Solving the Problem

The present invention employs the following aspects in order to solve the above problems and to achieve the object. That is to say:

(1) A vehicle operation device of one aspect according to the present invention is provided with: a grip part that is provided on a steering wheel of a vehicle, and which is grippable by an operator; an operation unit provided on the grip part and that has an operation panel in which contact operations are possible by the fingers of the operator; an operation detection device that detects contact operations with respect to the operation panel by the fingers of the operator with a predetermined coordinate system that is set on the operation panel as a reference; a display unit in which an arrangement is fixed regardless of the rotation of the steering wheel; a display control device that controls the display of the display unit according to the contact operations detected by the operation detection device; a steering angle detection device that detects a steering angle of the steering wheel; a travel state detection device that detects a travel state of the vehicle; a correction device that corrects the coordinate system according to the steering angle detected by the steering angle detection device; and a correction prohibition device that, based on at least one from among the contact operations detected by the operation detection device, the steering angle detected by the steering angle detection device, and the travel state detected by the travel state detection device, prohibits correction of the coordinate system by the correction device even if the steering angle is more than a predetermined steering angle.

(2) In the aspect of (1) above, the correction prohibition device may, in a case where steering with respect to the steering wheel is started during execution of the contact operation, which was started in a state in which steering with respect to the steering wheel was not executed, prohibits the correction of the coordinate system by the correction device.

(3) In the aspect of (1) above, there may be further provided an operation finger detection device which detects a type of finger used for the contact operation and that is making contact with the operation panel; and the correction prohibition device may, according to the type of finger detected by the operation finger detection device, prohibit correction of the coordinate system by the correction device.

(4) In the aspect of (1) above, the correction prohibition device may, in a state in which the steering angle is more than the predetermined steering angle, release prohibition of the correction in a case where a change of the steering angle over more than a predetermined time is less than a predetermined change, or in a case where a travel speed of the vehicle is less than a predetermined speed.

(5) In the aspect of (1) above, there may be further provided a selection device whereby the operator is able to select whether or not to release prohibition of the correction by the correction prohibition device, and the correction prohibition device may, in a case where the operator selects by means of the selection device release of prohibition of the correction by the correction prohibition device, release the prohibition of the correction.

(6) In the aspect of (5) above, there may be provided a coordinate system display device that displays coordinate axis directions of the coordinate system on the operation panel.

(7) In the aspect of (6) above, the operation detection device may change a detectable region on the operation panel according to changes in the steering angle, and change detection resolution according to the size of the change of the detectable region.

Effects of the Invention

According to the aspect of (1) above, for example by providing the correction device which corrects the coordinate system that is made a reference at the time of detecting a contact operation such as a sliding operation on the operation panel, according to the steering angle of the steering wheel, then for example in a case where the steering angle is more than a predetermined steering angle, and the like, it becomes possible for the operator to easily perform the desired contact operation even while still gripping the steering wheel.

In addition to this, by providing the correction prohibition device which, in a predetermined state based on at least any one from among; the contact operation, the steering angle, and the travel state (for example the speed and whether or not automatic travel is executed), for example a state where the operator does not desire the correction of the coordinate system, and the like, prohibits the correction of the coordinate system even if the steering angle is more than the predetermined steering angle, the intention of the operator can be appropriately reflected in the contact operation detected by the operation detection device.

If the coordinate system becomes corrected during the execution of a contact operation, a need to change the contact operation according to the change in the coordinate system arises, and there is a case where it becomes difficult to accurately perform the desired contact operation.

In the case of (2) above, in contrast, by prohibiting the correction of the coordinate system during the execution of a contact operation, it is possible to easily perform the desired contact operation.

In the case of (3) above, it is possible to detect, for example, the gripping state of the steering wheel, the method of the contact operation, the operation situation, and the like, according to the type of finger (such as the thumb or the forefinger for example) used for the contact operation, and by determining the necessity of a correction of the coordinate system according to this detection result, the intention of the operator can be appropriately reflected in the contact operation detected by the operation detection device, and operability can be improved.

In the case of (4) above, it is possible to determine that the operator is in a state desiring a correction of the coordinate system, and the intention of the operator can be appropriately reflected in the contact operation detected by the operation detection device, and operability can be improved.

For example, in a case where, at the time of a right turn, the vehicle is stopped while the steering wheel is turned to the right, or in a case where a gentle curve is navigated over more than a predetermined time, and the like, it is possible to determine that the operator is in a state desiring a correction of the coordinate system, and by executing a correction of the coordinate system, the intention of the operator can be appropriately reflected, and operability improved.

In the case of (5) above, since the necessity of a correction of the coordinate system is directly selected by the operator, the intention of the operator can be appropriately reflected in the contact operation detected by the operation detection device, and operability improved.

In the case of (6) above, the occurrence of misoperations can be prevented, and user-friendliness improved.

In the case of (7) above, for example, by rotating the operation panel together with the steering wheel, then even if it is a case where the size of the detectable region in the vertical direction and the horizontal direction becomes smaller, by increasing the detection resolution, the contact operation by the operator can be appropriately detected, and user-friendliness can be improved.

BRIEF DESCRIPTION OF THE DRAWINGS

FIG. 2 is a block diagram of the same vehicle operation device.

DESCRIPTION OF EMBODIMENTS

Hereunder, a vehicle operation device according to an embodiment of the present invention is described with reference to the accompanying drawings.

Figure 1:
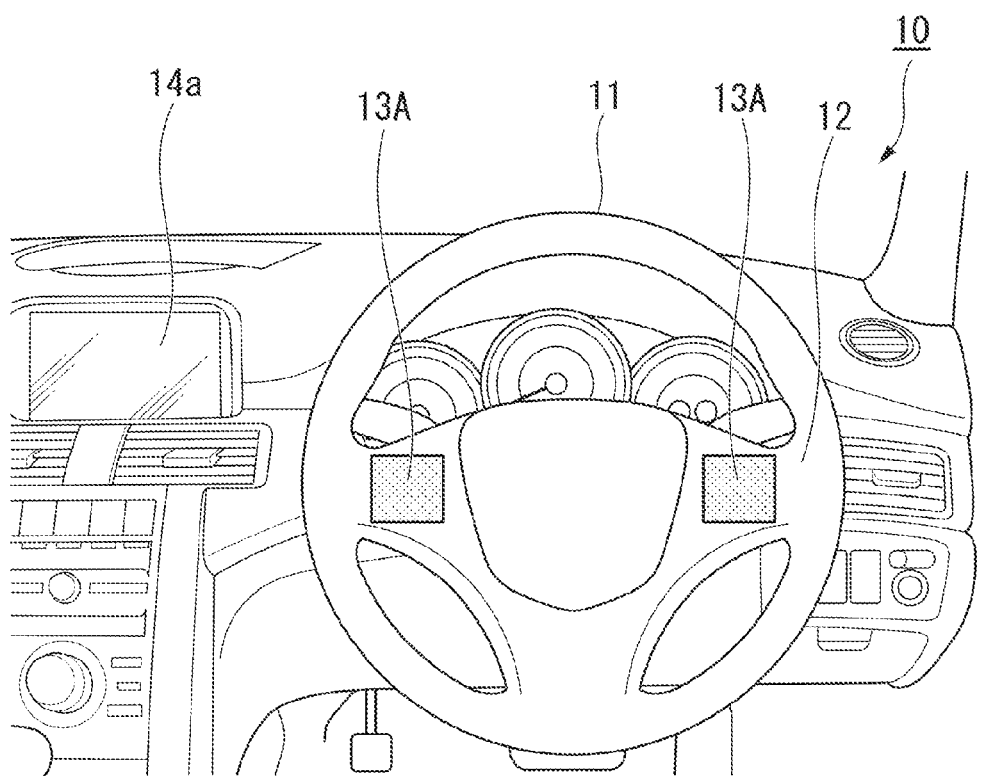
FIG. 1 is a configuration diagram of a vehicle operation device according to an embodiment of the present invention.

The vehicle operation device 10 according to the present embodiment, for example as shown in FIG. 1 and FIG. 2, is configured by being provided with: a grip part 12 that is provided on a steering wheel 11 of a vehicle, and which is grippable by an operator; an operation unit 13 provided on the grip part 12, and that has an operation panel 13A in which contact operations are possible by the fingers of an operator; a display device 14; a finger sensor 15; gyro sensor 16; a steering angle sensor 17; a speed sensor 18; a yaw rate sensor 19; an external sensor 20; a mode setting switch 21; and a control device 22.

Further, the vehicle operation device 10 controls the operation of various on-board equipment such as, in addition to the display device 14, a throttle actuator 23, a brake actuator 24, and a steering actuator 25 for example, according to input operations by an operator (the driver for example).

The operation unit 13 represents a touch pad and the like comprising a touch sensor using a capacitive sensor for example, and outputs a signal according to a contact operation (for example, a pressing operation, a sliding operation, a gesturing operation, and the like) by the fingers of the operator with respect to the operation panel 13A.

The display device (display unit) 14 is provided with a display screen (display unit) 14a, in which the arrangement within the vehicle cabin is fixed regardless of the rotation of the steering wheel 11.

The display device 14 represents for example a dashboard display in which the display screen 14a is arranged on the upper portion of the dashboard of the vehicle, a head-up display in which display is performed with the surface of the front window of the vehicle as the display screen 14a, a multi-information display in which the display screen 14a is arranged on the instrument panel of the vehicle, or a display in which the display screen 14a is arranged in the vicinity of the various instruments of the instrument panel of the vehicle.

The display device 14 displays on the display screen 14a such that it is visible to the operator, an operation target (such as an icon for example) which is operable according to a contact operation by the fingers of the operator with respect to the operation panel 13A of the operation unit 13.

The finger sensor 15 comprises, for example, an electrostatic sensor, an optical sensor, a temperature sensor, or a pressure sensor and the like, and detects the gripping direction and the gripping position of the hands of the operator, the orientation and the position of the respective fingers, and the like, on the grip part 12 of the steering wheel 11, and outputs a signal of the detection result to the control device 22.

The gyro sensor 16 detects the orientation of the vehicle body, and outputs a signal of the detection result to the control device 22.

The steering angle sensor 17 detects the steering angle of the steering wheel 11, which is rotatingly operated by the driver, and outputs a signal of the detection result to the control device 22.

The speed sensor 18 detects the speed of the vehicle, and outputs a signal of the detection result to the control device 22.

The yaw rate sensor 19 detects the yaw rate, or in other words, the rotation angle velocity about the vertical direction axis of the vehicle center of gravity, and outputs a signal of the detection result to the control device 22.

The external sensor 20 is configured by, for example, a radar device by way of electromagnetic waves, or an imaging device and the like.

For example, the radar device is made to scan a detection target region (such as the forward region of the direction of movement for example) set to the exterior of the vehicle, and transmits a transmission signal of an electromagnetic wave. Then, it receives reflected signals that occur as a result of the transmission signal being reflected by an object (such as a leading vehicle or a structure for example) external to the vehicle, generates a detection signal related to the distance or the like from the radar device to the external object, and outputs it to the control device 22.

Furthermore, for example, the imaging device performs image processing on an image obtained as a result of imaging an imaging region (such as the forward region of the direction of movement for example) set external to the vehicle by means of a camera, generates image data, and outputs it to the control device 22.

The mode setting switch 21 outputs a signal that instructs whether or not to execute various automatic travel modes such as; a following travel mode for automatically following a leading vehicle according to a target following distance, a cruise travel mode for automatically traveling at a speed according to a target vehicle speed, or a travel path maintaining mode for automatically traveling along a travel classification line on the road surface of the travel path for example, according to an input operation by the operator.

Further, the mode setting switch 21 outputs a signal that instructs an increase or a decrease in the target following distance or the target vehicle speed according to an input operation by the operator.

The control device 22 outputs control signals for controlling the operation of various on-board equipment, such as, in addition to the display device 14, a throttle actuator 23, a brake actuator 24, and a steering actuator 25 for example, according to an input operation with respect to the operation unit 13 by the operator (the driver for example).

The control device 22 is configured by being provided with for example; an operation detection unit 31, an operation finger detection unit 32, a selection unit 33, a leading vehicle detection unit 34, a travel classification line detection unit 35, target following distance and target vehicle speed determination unit 36, a correction unit 37, a display control unit 38, a correction prohibition unit 39, and a travel control unit 40.

The operation detection unit 31, based on the signal output from the operation unit 13, detects the contact operation (for example the presence of a pressing operation and the pressing force, the operation direction of a sliding operation and the operation amount, or the presence of various gesturing operations, such as tapping, stroking, pinching, tracing, twisting, and sweeping) by the fingers of the operator with respect to the operation panel 13A with a fixed coordinate system set on the operation panel 13A as a reference, and outputs a signal of the detection result.

The operation finger detection unit 32, based on the signal of the detection result output from the finger sensor 15, detects the type of finger (such as a thumb or a forefinger for example) used for the contact operation by the operator with respect to the operation panel 13A and that is making contact with the operation panel 13A, and outputs a signal of the detection result.

The selection unit 33, for example, based on the signal output from the operation unit 13, that is to say, the signal of the predetermined contact operation by the fingers of the operator with respect operation panel 13A, or a switching signal (an ON/OFF signal for example) output from an appropriate switch (not shown in the drawing) and the like, outputs a signal of the selection result of the operator with respect to whether or not correction prohibition by the correction prohibition unit 39 mentioned below is to be released.

The leading vehicle detection unit 34, for example, based on the detection signal output from the radar device of the external sensor 20, or the image data output from the imaging device of the external sensor 20, detects the presence of a leading vehicle traveling ahead of the vehicle, and outputs information, such as the following distance or the relative speed, with respect to the leading vehicle.

The travel classification line detection unit 35, for example, based on the image data output from the imaging device of the external sensor 20, detects a travel classification line provided on the road surface of the travel path in which the vehicle is traveling, and outputs a signal of the detection result.

The target following distance and target vehicle speed determination unit 36, for example, based on the signal output from the mode setting switch 21, determines the target following distance with respect to the leading vehicle in the following travel mode, or the target vehicle speed in the cruise travel mode.

The correction unit 37, based on the signals of the detection results output from the steering angle sensor 17 and the gyro sensor 16, in a case such as one where the steering angle represents more than a predetermined steering angle for example, corrects the coordinate system that is made a reference at the time a contact operation, such as a sliding operation on the operation panel 13A, is detected by the operation detection unit 31.

The display control unit 38, according to the signal of the detection result output from the operation detection unit 31, controls the display of the operation target (such as an icon for example) on the display screen 14a of the display device 14.

For example, the display control unit 38 stores a predetermined correspondence relationship with respect to an X direction and a Y direction forming a two-dimensional coordinate system set with respect to the control panel 13A, which is made a reference at the time the operation direction of the contact operation by the operator with respect to the operation panel 13A is detected by the operation detection unit 31, and an X direction and a Y direction forming a display coordinate system that is fixed beforehand with respect to the display screen 14a, which is made a reference at the time the movement direction of the operation target (such as an icon for example) on the display screen 14a of the display device 14 is set.

Then, using the correspondence relationship between the coordinate system of the operation panel 13A and the display coordinate system of the display screen 14a, the movement direction of the operation target (such as an icon for example) on the display screen 14a is set according to the operation direction of the contact operation by the operator detected by the operation detection unit 31.

Figure 3A:
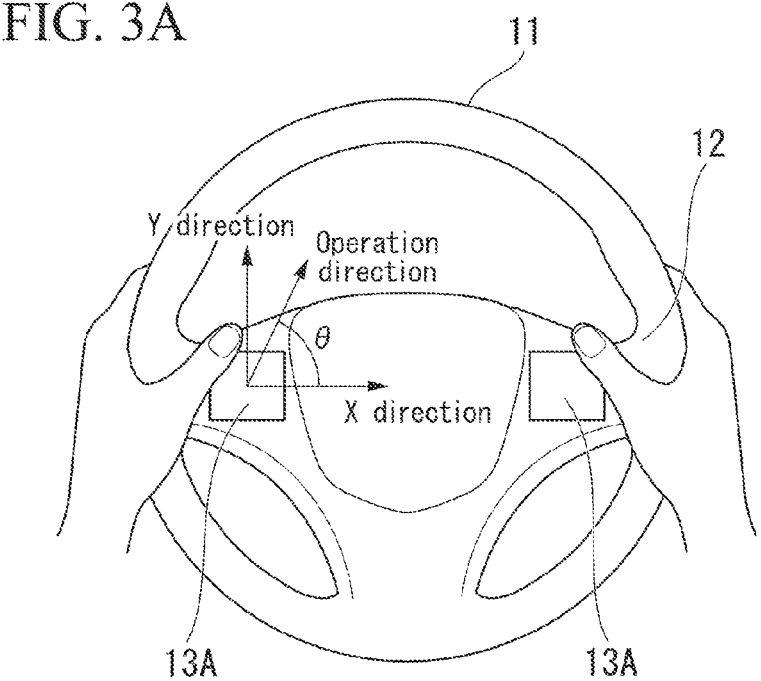
FIG. 3A is a drawing showing an example of an operation direction on the operation panel in a two-dimensional fixed coordinate system that is fixed beforehand with respect to the operation panel of the same vehicle operation device.
Figure 3B:
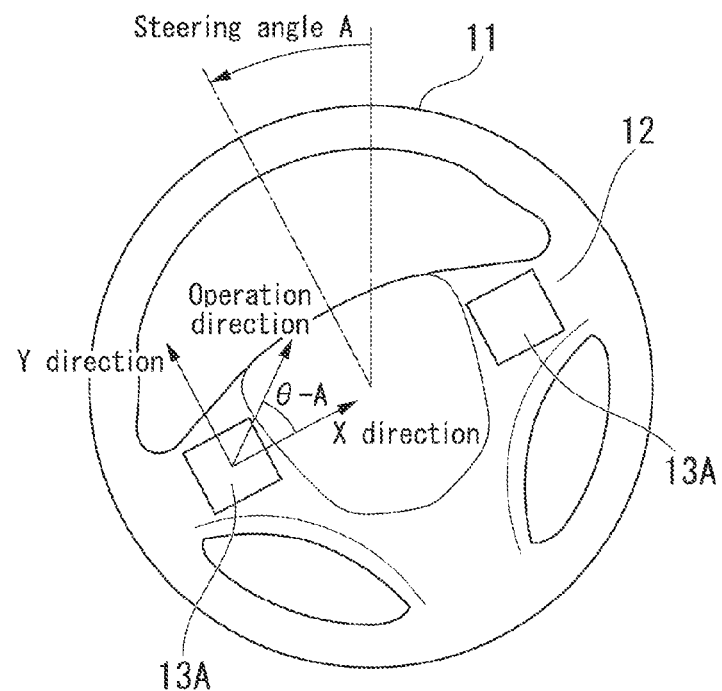
FIG. 3B is a drawing showing an example of an operation direction on the operation panel in a two-dimensional fixed coordinate system that is fixed beforehand with respect to the operation panel of the same vehicle operation device.

As shown in FIG. 3A and FIG. 3B for example, in a case where the operator performs a sliding operation by means of a finger (the left thumb for example) of a hand gripping the steering wheel 11 in a predetermined operation direction (that is to say, a fixed direction with respect to the three directions of up-down, left-right, and front-rear of the vehicle) on the operation panel 13A of the operation unit 13, when steering of the steering wheel 11 is executed, the operation panel 13A rotates about a rotation axis together with the steering wheel 11.

Meanwhile, the X direction and the Y direction, which form the two-dimensional fixed coordinate system that is set beforehand with respect to the operation panel 13A, are changed by the amount of the steering angle of the steering wheel 11 in a case where steering of the steering wheel 11 is not executed, and in a case where steering of the steering wheel 11 is executed.

Figure 4A:
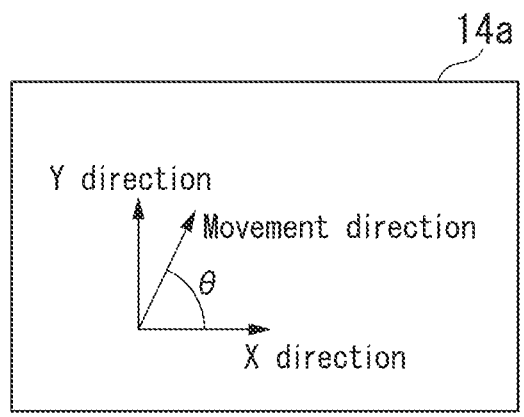
FIG. 4A is a drawing showing an example of a movement direction of an operation target on the display screen of the same vehicle operation device that corresponds to the operation direction of FIG. 3A.

For example, as shown in FIG. 3A, in a case where steering of the steering wheel 11 is not executed, the operation direction of the contact operation by the operator, which is detected by the operation detection unit 31 with the fixed coordinate system of the operation panel 13A as a reference, for example, as shown in FIG. 4A, matches the movement direction of the operation target (such as an icon for example) set by means of the display control unit 38 with the X direction and the Y direction forming the display coordinate system fixed beforehand with respect to the display screen 14a of the display device 14 as a reference.

Figure 4B:
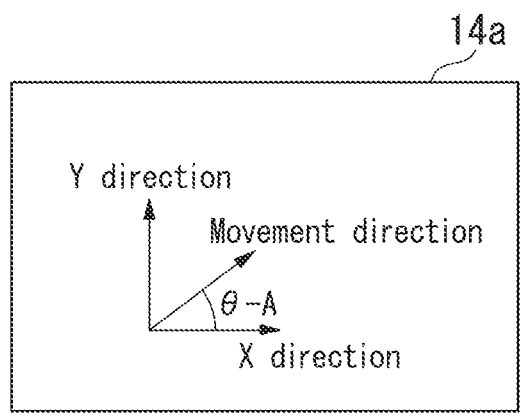
FIG. 4B is a drawing showing an example of a movement direction of an operation target on the display screen of the same vehicle operation device that corresponds to the operation direction of FIG. 3B.

On the other hand, for example, as shown in FIG. 3B, in a case where steering of the steering wheel 11 is executed, the operation direction, which is detected by the operation detection unit 31 with the fixed coordinate system of the operation panel 13A as a reference, for example, as shown in FIG. 4B, does not match the movement direction of the operation target (such as an icon for example) set by the display control unit 38 with the display coordinate system of the display screen 14a of the display device 14 as a reference, and is offset by the amount of the steering angle of the steering wheel 11.

The X direction and the Y direction forming the display coordinate system that is fixed beforehand with respect to the display screen 14a of the display device 14 is for example the same as the X direction and the Y direction forming the fixed coordinate system of the operation panel 13A in a case where steering of the steering wheel 11 is not executed, and represent the left-right direction and the up-down direction, and the like, of the vehicle.

Figure 5A:
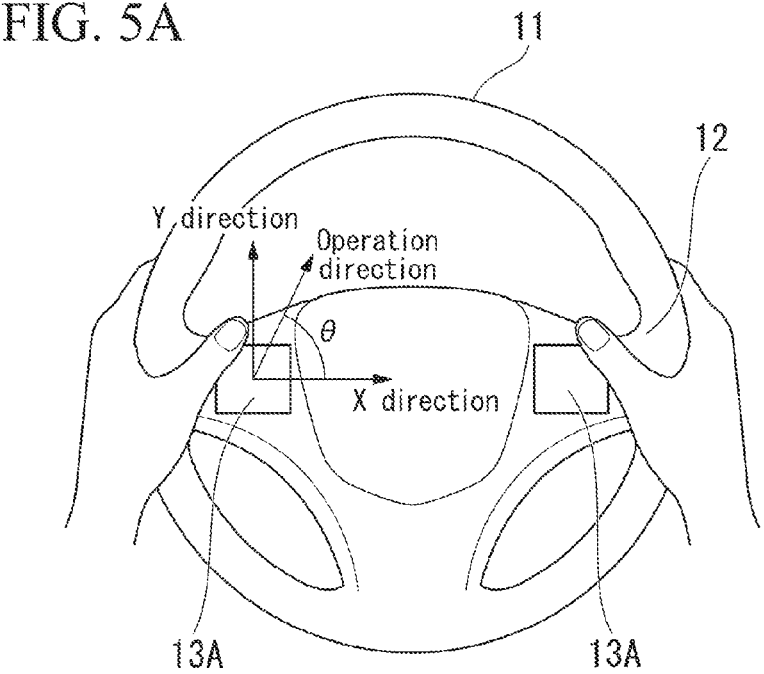
FIG. 5A is a drawing showing an example of an operation direction on the operation panel in a two-dimensional fixed coordinate system that is fixed beforehand with respect to the operation panel of the same vehicle operation device.
Figure 5B:
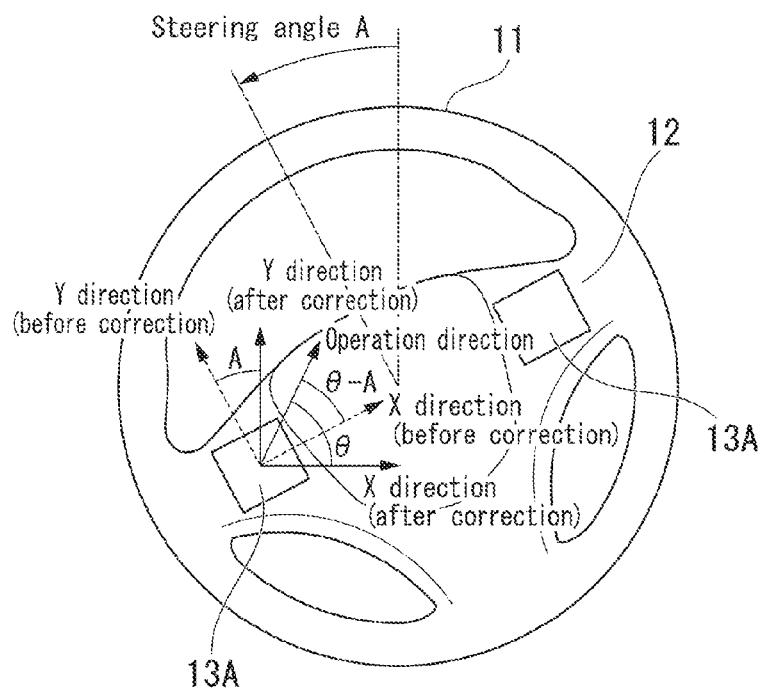
FIG. 5B is a drawing showing an example of an operation direction on the operation panel in a two-dimensional fixed coordinate system that is fixed beforehand with respect to the operation panel of the same vehicle operation device.

In contrast, when the X direction and the Y direction forming the two-dimensional fixed coordinate system, which is fixed beforehand with respect to the operation panel 13A, are corrected according to the steering angle of the steering wheel 11 by means of the correction unit 37, then for example as shown in FIG. 5A and FIG. 5B, the X direction and the Y direction forming the fixed coordinate system of the operation panel 13A in a case where steering of the steering wheel 11 is not executed matches the X direction and the Y direction forming the coordinate system following correction obtained by means of a correction by the correction unit 37 in a case where steering of the steering wheel 11 is executed.

Figure 6A:
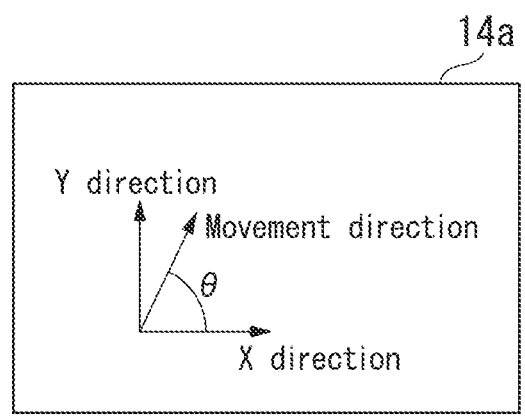
FIG. 6A is a drawing showing an example of a movement direction of an operation target on the display screen of the same vehicle operation device that corresponds to the operation direction of FIG. 5A.
Figure 6B:
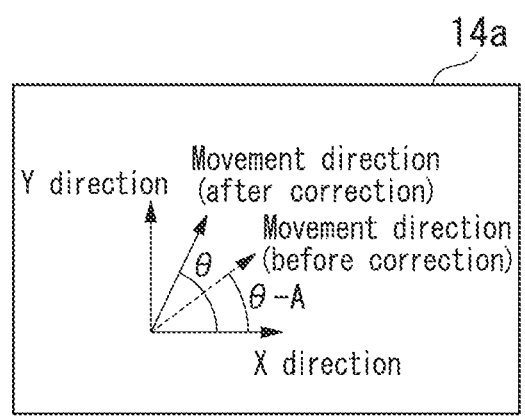
FIG. 6B is a drawing showing an example of a movement direction of an operation target on the display screen of the same vehicle operation device that corresponds to the operation direction of FIG. 5B.

Meanwhile, for example, as shown in FIG. 6A and FIG. 6B, in a case where steering of the steering wheel 11 is not executed and the case where steering of the steering wheel 11 is executed, the movement directions of the operation target (such as an icon for example) set by means of the display control unit 38 with the X direction and the Y direction forming the display coordinate system as a reference, which is fixed beforehand with respect to the display screen 14a of the display device 14, are matched.

The correction prohibition unit 39, for example, based on at least one from among; the signal of the detection result output from the operation detection unit 31, the signal of the detection result output from the steering angle sensor 17, the signal of the detection result output from the speed sensor 18, and the signal output from the mode setting switch 21, and further, according to the execution timing, the operation situation, the movement of the fingers, the operation method, and the like, of the contact operation with respect to the operation panel 13A of the operation unit 13, even if the steering angle of the steering wheel 11 is more than a predetermined steering angle, prohibits the correction of the coordinate system by means of the correction unit 37, or changes the execution timing of the correction of the coordinate system by means of the correction unit 37.

Examples of the predetermined operation situation include a case where, during execution of a contact operation with respect to the operation panel 13A of the operation unit 13 by the operator in a state in which steering with respect to the steering wheel 11 is not executed by the operator, steering with respect to the steering wheel 11 that is not due to the operator is started.

The correction prohibition unit 39 detects this predetermined operation situation, and prohibits the correction of the coordinate system by means of the correction unit 37 in this predetermined operation situation.

This predetermined operation situation, for example, represents a case where a contact operation with respect to the operation panel 13A is executed by the fingers of the operator in a state in which various automatic travel modes (such as the following travel mode, the cruise travel mode, or the travel path maintaining mode) are executed according to an input operation by the operator.

In this case, compared to a time of non-execution of the automatic travel modes (that is to say, when steering of the steering wheel 11 is executed by the operator), it becomes easier for the operator to concentrate on the contact operation with respect to the operation panel 13A, and it becomes easier to perform the contact operation with recognition of the fixed coordinate system of the operation panel 13A.

Furthermore, as the predetermined operation situation, for example, even if the operation panel 13A, according to the steering of the steering wheel 11, rotates about the rotation axis together with the steering wheel 11, there is a case where there is a high probability of the operator performing the contact operation with recognition of the fixed coordinate system of the operation panel 13A.

For example this is a case where there is a display or a member provided that displays the X direction and the Y direction forming the two-dimensional fixed coordinate system that is fixed beforehand with respect to the operation panel 13A of the operation unit 13.

Furthermore for example this is a case where the display or the member showing the X direction and the Y direction forming the two-dimensional fixed coordinate system provided on the rear surface side of the operation unit 13 is visible from the front surface side (that is to say, the operation panel 13A side) through the operation unit 13.

Moreover for example this is a case where the display showing the X direction and the Y direction forming the two-dimensional fixed coordinate system is visible from the front surface side (that is to say, the operation panel 13A side) of the operation unit 13 by means of transmitted illumination by a light source provided on the rear surface side of the operation unit 13.

Figure 7A:
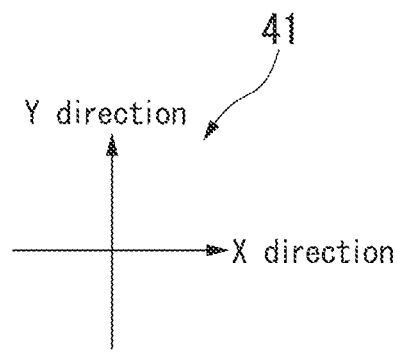
FIG. 7A is a drawing showing an example of a display showing the X direction and the Y direction forming the two-dimensional coordinate system that is fixed beforehand with respect to the operation panel of the same vehicle operation device.

More specifically, for example as shown in FIG. 7A, this is a case where there is provided a coordinate axis display 41 showing the respective coordinate axes of the X direction and the Y direction forming the two-dimensional fixed coordinate system that is fixed beforehand on the operation panel 13A of the operation unit 13.

Figure 7B:
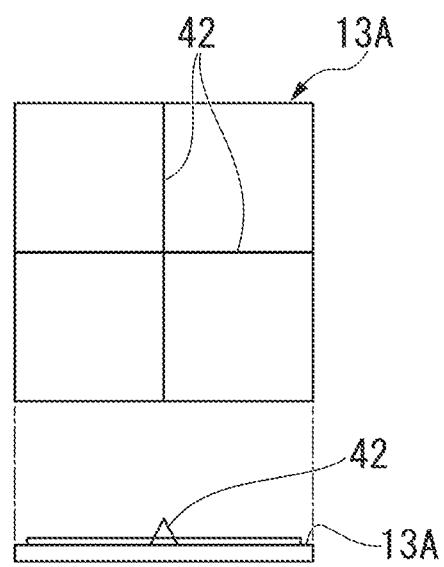
FIG. 7B is a drawing showing an example of a member showing the X direction and the Y direction forming the two-dimensional coordinate system that is fixed beforehand with respect to the operation panel of the same vehicle operation device.

Furthermore for example as shown in FIG. 7B, this is a case where coordinate axis protrusions 42 extending in the X direction and the Y direction forming the two-dimensional fixed coordinate system that are fixed beforehand on the operation panel 13A of the operation unit 13, and a cover that is provided on the surface, are arranged on the operation panel 13A.

Figure 7C:
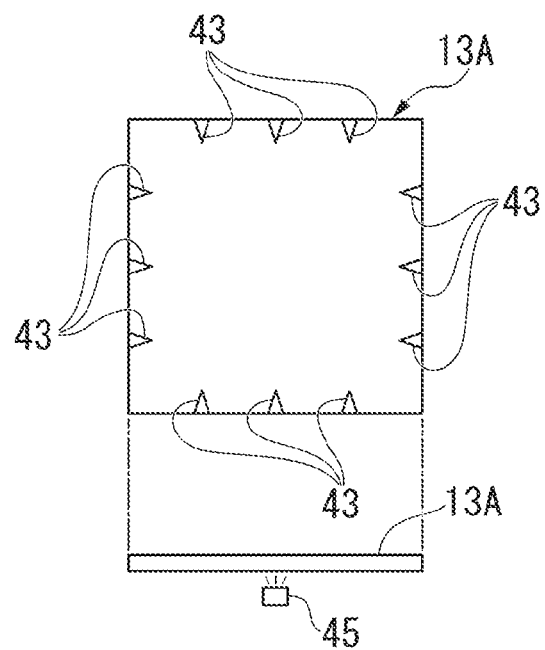
FIG. 7C is a drawing showing an example of a display showing the X direction and the Y direction forming the two-dimensional coordinate system that is fixed beforehand with respect to the operation panel of the same vehicle operation device.

Moreover for example as shown in FIG. 7C, this a case where there is provided an arrow display 43 that indicates the X direction and the Y direction forming the two-dimensional fixed coordinate system that is fixed beforehand on the operation panel 13A of the operation unit 13, and further, the arrow display 43 is illuminated by means of transmitted illumination by a light source 45 provided on the rear surface side of the operation unit 13.

Figure 7D:
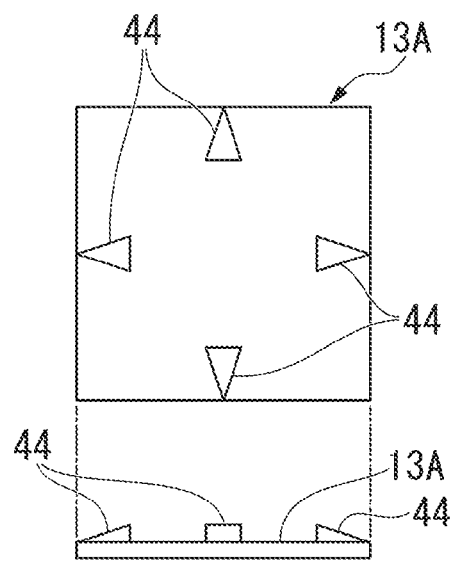
FIG. 7D is a drawing showing an example of a member showing the X direction and the Y direction forming the two-dimensional coordinate system that is fixed beforehand with respect to the operation panel of the same vehicle operation device.

For example as shown in FIG. 7D, this is a case where there are provided arrow-shaped protrusions 44 formed by transparent members protruding from the surface of the operation panel 13A of the operation unit 13, in which transmitted illumination is made possible by means of a light source (not shown in the drawing) arranged on the back of the operation panel 13A, that indicate the X direction and the Y direction forming the two-dimensional fixed coordinate system that is fixed beforehand on the operation panel 13A.

Furthermore, as the predetermined operation situation, for example there is a case where the operation unit 13, based on a signal output from the gyro sensor 16, detects the three directions of up-down, left-right, and front-rear of the vehicle regardless of the steering of the steering wheel 11, and with respect to these three directions, sets a coordinate system comprising a fixed X direction and Y direction with respect to the operation panel 13A.

That is to say, this is a case where the operation unit 13 converts the coordinate system that is made a reference at the time a contact operation on the operation panel 13A is detected by means of the operation detection unit 31, based on the signal output from the gyro sensor 16, regardless of the steering of the steering wheel 11.

Figure 8A:
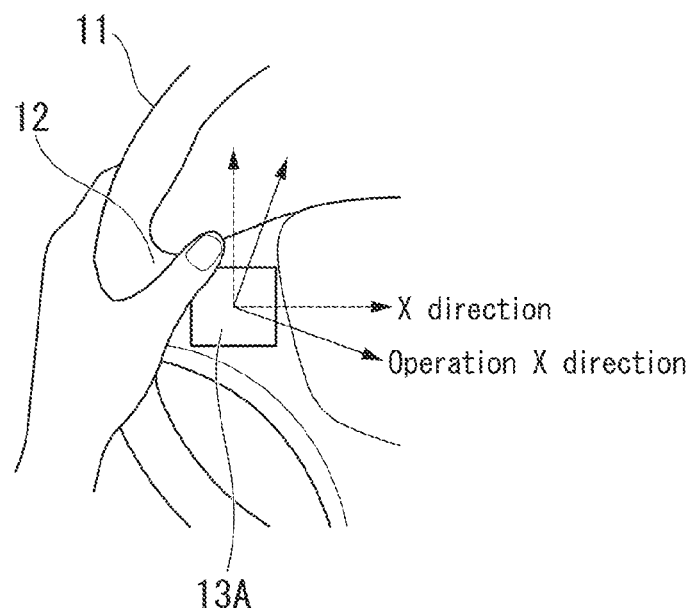
FIG. 8A is a drawing showing an example of an operation panel in which the arrangement on the grip part of the steering wheel of the same vehicle operation device is changeable.
Figure 8B:
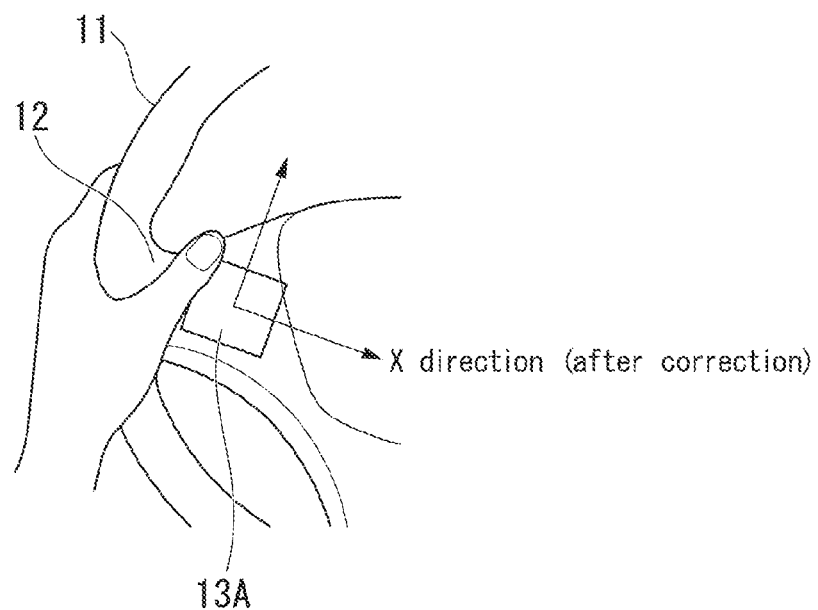
FIG. 8B is a drawing showing an example of an operation panel in which the arrangement on the grip part of the steering wheel of the same vehicle operation device is changeable.

Moreover, as the predetermined operation situation, for example as shown in FIG. 8A and FIG. 8B, there is a case where the operation unit 13 is able to change the arrangement of the operation panel 13A on the grip part 12 of the steering wheel 11, and the arrangement of the operation panel 13A on the grip part 12 is changed by the operation unit 13 such that the coordinate system intended by the operator with respect to the operation panel 13A, and the coordinate system set with respect to the operation panel 13A (that is to say, the coordinate system that is made a reference at the time a contact operation on the operation panel 13A is detected by the operation detection unit 31), are matched.

In this case, for example, as shown in FIG. 8A, in a case where the X direction forming the two-dimensional fixed coordinate system that is set beforehand on the operation panel 13A and the X direction of the coordinate system intended by the operator with respect to the operation panel 13A (operation X direction) are offset, the operation unit 13, as shown in FIG. 8B for example, changes the arrangement of the operation panel 13A on the grip part 12, and matches the X direction (following correction) forming the two-dimensional fixed coordinate system that is fixed beforehand on the operation panel 13A and the X direction of the coordinate system intended by the operator with respect to the operation panel 13A (operation X direction).

Furthermore, as the predetermined operation situation, for example there is a case where it is detected by the finger sensor 15 and the like, that the hand of the operator has separated from the steering wheel 11 immediately prior to starting the execution of a contact operation, and it is determined by the correction prohibition unit 39 that there is a possibility that the steering wheel 11 has been regripped to match the position of the operation panel 13A.

Moreover, as the predetermined operation situation, for example there is a case where it is detected by the finger sensor 15 and the like, that the hand of the operator has separated from the steering wheel 11 during the execution of a contact operation, and it is determined by the correction prohibition unit 39 that there is a possibility that the steering wheel 11 has been regripped to match the position of the operation panel 13A.

Furthermore, as the predetermined operation situation, for example there is a case where it is detected by the finger sensor 15 and the like, that the fingers used for the contact operation that are making contact with the operation panel 13A are upwardly moving in the vertical direction of the vehicle, and it is determined by the correction prohibition unit 39 that the operator's own fingers easily enter the field of vision of the operator, the operation direction of the operator's own fingers is visible to the operator, and the occurrence of misoperations is unlikely.

In this manner, in a case where it is detected by the finger sensor 15 that the fingers used for the contact operation that are making contact with the operation panel 13A are downwardly moving in the vertical direction of the vehicle, then for example the correction prohibition unit 39 releases the prohibition on the correction of the coordinate system by the correction unit 37.

Furthermore, as the predetermined operation situation, there is a case where the operation detection unit 31 is able to estimate the operation content from not only just the specific operation directions on the operation panel 13A, but from, with respect to gesturing operations and the like, the movement direction of the fingers at the time of the operation or the input direction of the operation, the strength of the force, and the input time and the like.

Figure 9A:
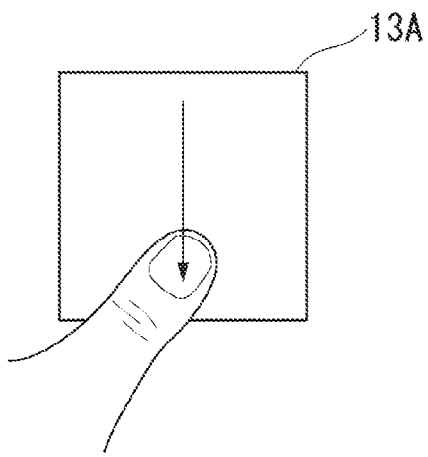
FIG. 9A is a drawing showing an example of a contact operation with respect to the operation panel of the same vehicle operation device.

More specifically, for example as shown in FIG. 9A, this is a case where it is detected by the operation detection unit 31 that there follows the movement of fingers (the left forefinger for example) other than the finger (the left thumb for example) used for the contact operation on the operation panel 13A and making contact with the operation panel 13A.

Figure 9B:
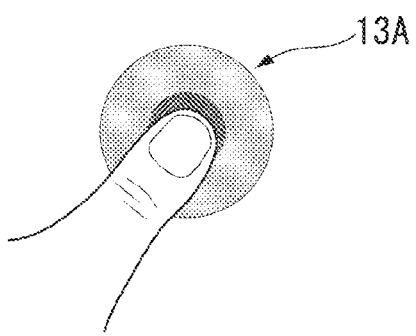
FIG. 9B is a drawing showing an example of a contact operation with respect to the operation panel of the same vehicle operation device.

Moreover, for example as shown in FIG. 9B, this a case where it is detected by the operation detection unit 31 that, where either the left or right hand (the left hand for example) is used for the contact operation on the operation panel 13A and is making contact with the operation panel 13A, more than a predetermined force is being input at an offset position on the operation panel 13A in the same direction side (the left side for example).

Figure 9C:
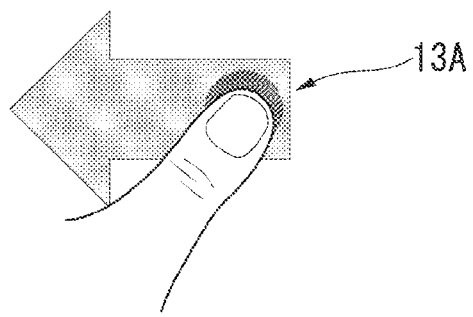
FIG. 9C is a drawing showing an example of a contact operation with respect to the operation panel of the same vehicle operation device.

Furthermore, for example as shown in FIG. 9C, this is a case where it is detected by the operation detection unit 31 that, where either the left or right hand (the left hand for example) is used for the contact operation on the operation panel 13A and is making contact with the operation panel 13A, more than a predetermined force toward the same direction side (the left side for example) is being input on the operation panel 13A over more than a predetermined time.

Moreover, for example, this is a case where it is detected by the operation detection unit 31 that it is a contact operation toward the front-rear direction of the vehicle, and a contact operation that represents pushing or pulling (separating) with respect to the operation panel 13A is being executed for example.

Figure 10A:
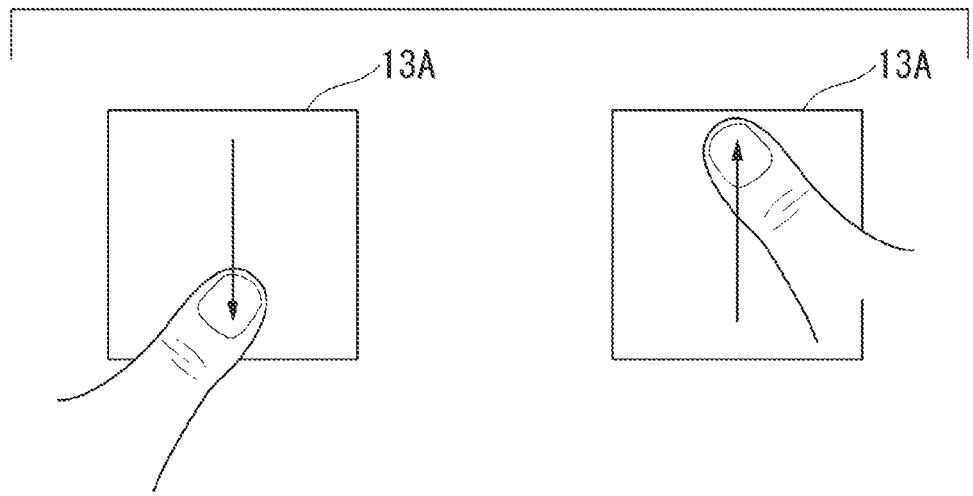
FIG. 10A is a drawing showing an example of a contact operation with respect to a pair of operation panels of the same vehicle operation device.
Figure 10B:
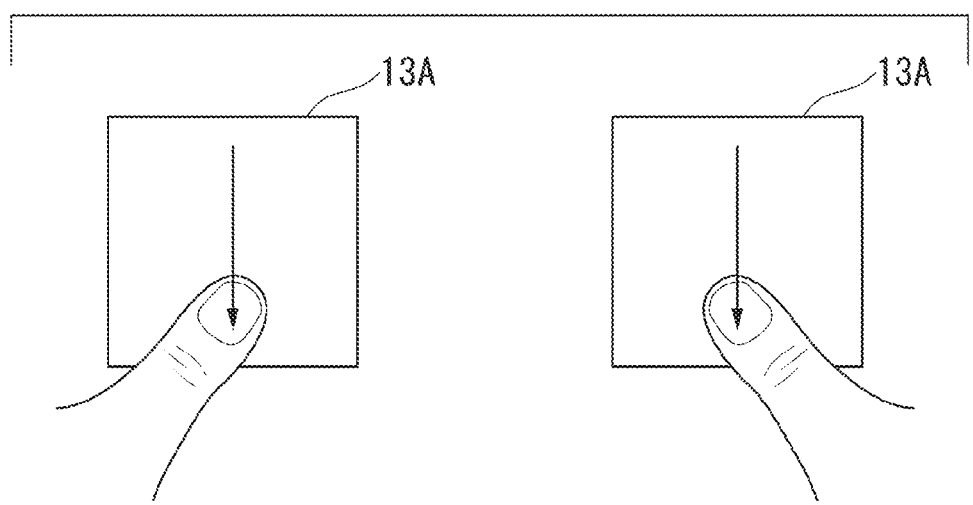
FIG. 10B is a drawing showing an example of a contact operation with respect to a pair of operation panels of the same vehicle operation device.

Furthermore, for example as shown in FIG. 10A and FIG. 10B, this is a case where the execution of a contact operation with respect to a pair of operation panels 13A and 13A, which are arranged such that they are spaced in the left-right direction of the vehicle, that is left-right asymmetric or left-right symmetric, is detectable by the finger sensor 15 and the operation detection unit 31, and the like, and in a state in which a predetermined detection error in the detection of the operation direction of the fingers is allowed, the execution of a contact operation that is left-right asymmetric or left-right symmetric with respect to the pair of operation panels 13A and 13A is detected.

The correction prohibition unit 39 may determine for example whether or not to prohibit the correction of the coordinate system by the correction unit 37, using as a trigger the execution of a contact operation for confirming the X direction and the Y direction forming the coordinate system intended beforehand by the operator with respect to the operation panel 13A.

For example, the correction prohibition unit 39, as a result of the operator executing beforehand a contact operation of a predetermined operation direction (such as the horizontal direction or the vertical direction for example), prohibits the correction of the coordinate system by the correction unit 37 in a case where processing that estimates the X direction and the Y direction forming the coordinate system intended by the operator with respect to the operation panel 13A, is executed by the operation unit 13.

Furthermore, for example the correction prohibition unit 39 may, based on the signals output from the finger sensor 15, the operation detection unit 31, and the operation finger detection unit 32, estimate the X direction and the Y direction forming the coordinate system intended by the operator with respect to the operation panel 13A, and determine whether or not to prohibit the correction of the coordinate system by the correction unit 37 according to this estimation result.

For example, the correction prohibition unit 39, in a case where the X direction and the Y direction forming the coordinate system intended by the operator with respect to the operation panel 13A obtained by the estimation, and the coordinate system set beforehand with respect to the operation panel 13A (that is to say, the coordinate system that is made a reference at the time the contact operation on the control panel 13A is detected by the operation detection unit 31) match, prohibits the correction of the coordinate system by the correction unit 37.

On the other hand for example the correction prohibition unit 39, in a state in which the steering angle of the steering wheel 11 is more than a predetermined steering angle, releases the prohibition over the correction of the coordinate system by the correction unit 37 in a case where the change of the steering angle over more than a predetermined time is less than a predetermined change, or in a case where the speed of the vehicle is less than a predetermined speed.

Furthermore for example, the correction prohibition unit 39, in a case where a signal representing that the operator has selected to release the prohibition over the correction of the coordinate system by the correction unit 37 is being output by the selection unit 33, releases the prohibition over the correction of the coordinate system by the correction unit 37.

Moreover for example, the correction prohibition unit 39, in a case where it is detected by the operation detection unit 31 that the operator performs a contact operation (such as tapping for example) that is intermittently repeated in the same direction or at the same position on the operation panel 13A, determines that there is a possibility of a change in the contact position or the operation direction of the fingers according to the steering of the steering wheel 11 as a result of the fingers separating from the surface of the operation panel 13A, and releases the prohibition over the correction of the coordinate system by the correction unit 37.

Furthermore for example, the correction prohibition unit 39, in a case where it is detected by the operation detection unit 31 that the operator performs a contact operation (such as a long press for example) over more than a predetermined time in the same direction or at the same position on the operation panel 13A, determines that there is a possibility of a change in the angle of the arms or the angle of the fingers used for the contact operation accompanying the steering of the steering wheel 11, and a change in the distance from the fingers used for the contact operation to the operation panel 13A, and releases the prohibition over the correction of the coordinate system by the correction unit 37.

Moreover for example, the correction prohibition unit 39, in a case where it is detected by the operation detection unit 31 that the fingers used for the contact operation and making contact with the operation panel 13A are moving in the left-right direction of the vehicle or rotatingly moving on the operation panel 13A, or a handwritten character input is being performed by the fingers used for the contact operation and that are making contact with the operation panel 13A, releases the prohibition over the correction of the coordinate system by the correction unit 37.

Furthermore for example, the correction prohibition unit 39, in a case where it is detected by the operation detection unit 31 that the force that is input to the operation panel 13A by the fingers used for the contact operation and that are making contact with the operation panel 13A is moving, such as a force moving in the left-right direction of the vehicle and the like, releases the prohibition over the correction of the coordinate system by the correction unit 37.

Moreover for example, the correction prohibition unit 39, in a case where it is detected by the operation detection unit 31 that a contact operation is performed at a predetermined position on the operation panel 13A, releases the prohibition over the correction of the coordinate system by the correction unit 37.

The travel control unit 40, based on the signals output from the respective sensors 17 to 20 and the mode setting switch 21, and the signals output from the respective detection units 34 and 35 and the target following distance and target vehicle speed determination unit 36, outputs for example a control signal that instructs the vehicle to be driven in the various automatic travel modes.

This control signal represents for example; a control signal that controls the transmission operations of the transmission (not shown in the drawing), a control signal that controls the driving force of the internal combustion engine (not shown in the drawing) by means of the throttle actuator 23, a control signal that controls deceleration by means of the brake actuator 24, a control signal that controls steering by means of the steering actuator 25, and the like.

As mentioned above, according to the vehicle operation device 10 of the present embodiment, for example, by providing the correction unit 37 which corrects the coordinate system that is made a reference at the time of detecting the contact operation such as a sliding operation on the operation panel 13A, according to the steering angle of the steering wheel 11, then for example in a case where the steering angle is more than a predetermined steering angle, and the like, it becomes possible for the operator to easily perform the desired contact operation even while still gripping the steering wheel 11.

In addition to this, by providing the correction prohibition unit 39 which, in a predetermined state based on at least any one from among; the contact operation, the steering angle, and the speed, such as in a state where the operator does not desire the correction of the coordinate system for example, prohibits the correction of the coordinate system even if the steering angle is more than the predetermined steering angle, the intention of the operator can be appropriately reflected in the contact operation detected by the operation detection unit 31.

Further, if the coordinate system becomes corrected during the execution of a contact operation, a need to change the contact operation according to the change in the coordinate system arises, and there is a case where it becomes difficult to accurately perform the desired contact operation.

In contrast, by prohibiting the correction of the coordinate system during the execution of a contact operation, it is possible to easily perform the desired contact operation.

In addition, it is possible to detect, for example, the gripping state of the steering wheel 11, the method of the contact operation, the operation situation, and the like, according to the type of finger (such as the thumb or the forefinger for example) used for the contact operation, and by determining the necessity of a correction of the coordinate system according to this detection result, the intention of the operator can be appropriately reflected in the contact operation detected by the operation detection unit 31, and operability can be improved.

Further, in a state in which the steering angle is more than a predetermined steering angle, in a case where the change of the steering angle over more than a predetermined time is less than a predetermined change, or in a case where the speed is less than a predetermined speed, it is possible to determine that the operator is in a state desiring a correction of the coordinate system, and the intention of the operator can be appropriately reflected in the contact operation detected by the operation detection unit 31, and operability can be improved.

For example, in a case where, at the time of a right turn, the vehicle is stopped while the steering wheel is turned to the right, or in a case where a gentle curve is navigated over more than a predetermined time, and the like, it is possible to determine that the operator is in a state desiring a correction of the coordinate system, and by executing the correction of the coordinate system, the intention of the operator can be appropriately reflected, and operability improved.

In addition, since the necessity of a correction of the coordinate system is determined according to the selection of the operator, the intention of the operator can be appropriately reflected in the contact operation detected by the operation detection unit 31, and operability improved.

In the vehicle operation device 10 according to the above-mentioned embodiment, the operation detection unit 31 may, based on a detection signal output from the steering angle sensor 17, change the detectable region on the operation panel 13A according to the change of the steering angle, and change the detection resolution according to the change in the size of the detectable region.

Figure 11A:
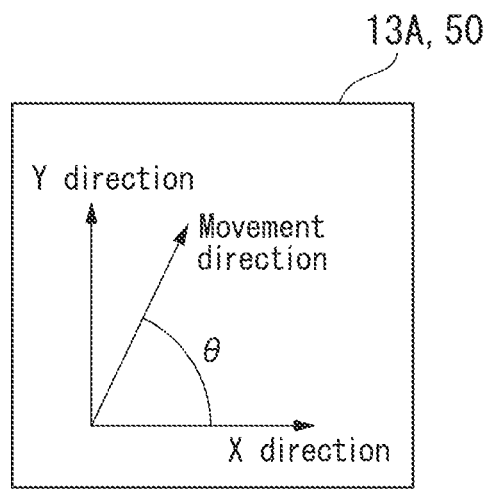
FIG. 11A is a drawing showing an example of the correspondence between the operation panel of the same vehicle operation device and a detectable region.

For example, in a case where, with respect to the rectangular operation panel 13A, steering of the steering wheel 11 is not executed as shown in FIG. 11A for example, the entire surface of the operation panel 13A is made the detectable region 50. Furthermore, in a case where steering of the steering wheel 11 is executed as shown in FIG. 11B for example, the rectangular detectable region 50 is contracted such that it falls within the operation panel 13A, which has rotated together with the steering of the steering wheel 11, and the detection resolution is increased.

Consequently, by rotating the operation panel 13A together with the steering wheel 11, then even if it is a case where the size of the detectable region 50 in the up-down direction and the left-right direction of the vehicle becomes smaller, by increasing the detection resolution, the contact operation by the operator can be appropriately detected, and user-friendliness can be improved.

Figure 11B:
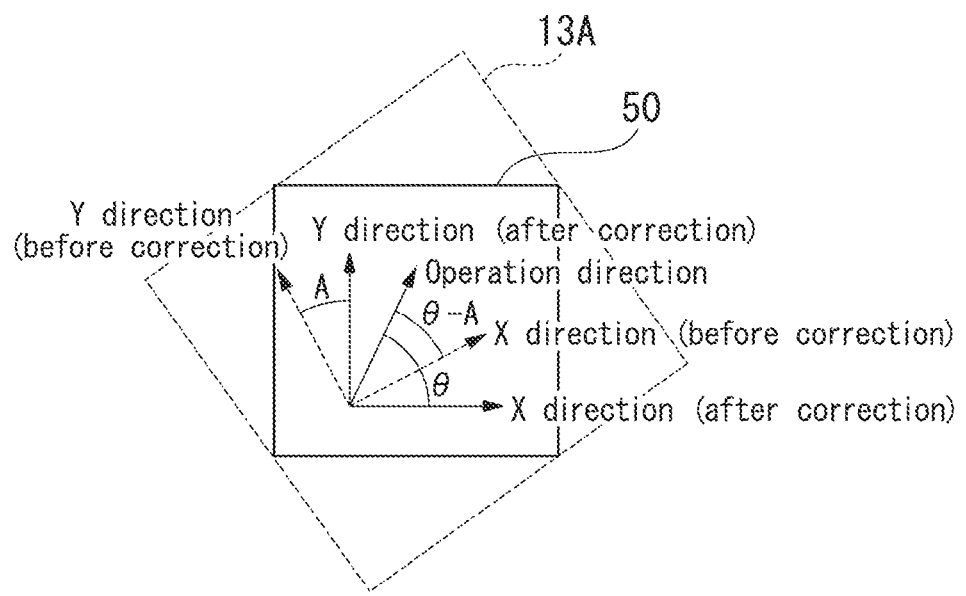
FIG. 11B is a drawing showing an example of the correspondence between the operation panel of the same vehicle operation device and the detectable region.

In a case where the size of the detectable region 50 changes together with the rotation of the operation panel 13A, then as shown in FIG. 11B for example, it is preferable for the coordinate system that is made a reference at the time the contact operation on the operation panel 13A is detected by the detectable region 50, to be corrected according to the steering angle of the steering wheel 11.

Consequently, the occurrence of misoperations can be prevented, and user-friendliness improved.

In the embodiment mentioned above, the operation unit 13 may exchangeably arrange various covers on the operation panel 13A, such as for example; a cover displaying the X direction and the Y direction forming the two-dimensional fixed coordinate system that is fixed beforehand on the operation panel 13A, a cover displaying the operation method, the operation direction, the operation position, and the like, allowed on the operation panel 13A, or a cover in which appropriate concavoconvex shapes are provided on the surface for assistance, and the like, of the contact operation.

The operation unit 13 may be provided for example with a driving mechanism for selecting the cover that is arranged on the operation panel 13A from among a plurality of covers, and exchanging it by means of a rotation movement, a sliding movement, and the like.

Figure 12A:
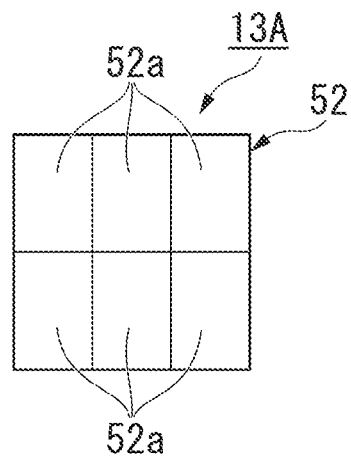
FIG. 12A is a drawing showing an example of a cover that is arranged on the operation panel of a vehicle operation device according to a modified example of the embodiment of the present invention.
Figure 12B:
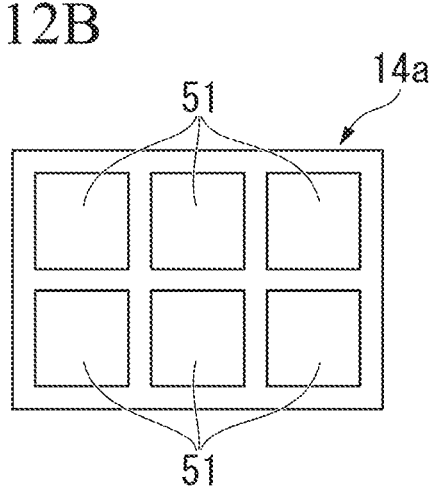
FIG. 12B is a drawing showing an example of a display screen corresponding to the cover of FIG. 12A.

For example, as shown in FIG. 12A and FIG. 12B, in a case where a plurality of selectable selection items 51 are displayed on the display screen 14a, it is acceptable if a cover 52 provided with a representation of a plurality of detectable regions 52a corresponding to these selection items 51, or a member such as a switch, is arranged on the operation panel 13A.

Figure 13A:
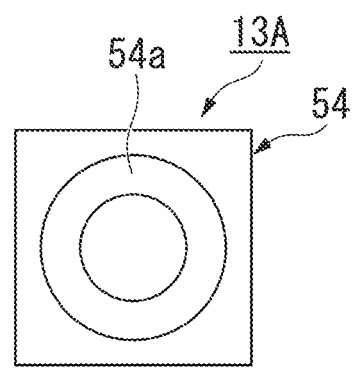
FIG. 13A is a drawing showing an example of a cover that is arranged on the operation panel of a vehicle operation device according to a modified example of the embodiment of the present invention.
Figure 13B:
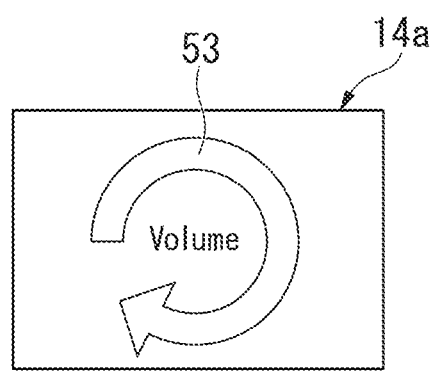
FIG. 13B is a drawing showing an example of a display screen corresponding to the cover of FIG. 13A.

Furthermore, for example as shown in FIG. 13A and FIG. 13B, in a case where an image 53 showing the operation trajectory of a predetermined sliding operation (for example, an image showing the operation trajectory of a rotation operation for continuously increasing and decreasing the volume, and the like) is displayed on the display screen 14a, it is acceptable if a cover 54 provided with a representation of the detectable region 54a of a shape corresponding to this operation trajectory (a circular shape for example), or a member such as a switch, is arranged on the operation panel 13A.

Figure 14A:
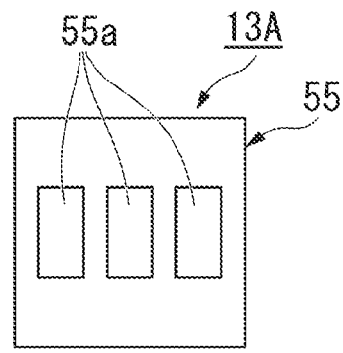
FIG. 14A is a drawing showing an example of a cover that is arranged on the operation panel of a vehicle operation device according to a modified example of the embodiment of the present invention.
Figure 14B:
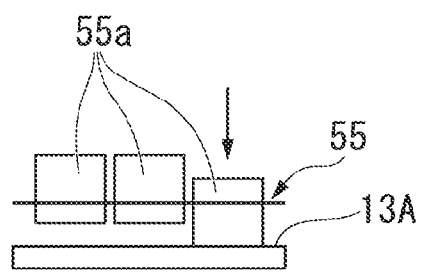
FIG. 14B is a drawing showing an example of a display screen corresponding to the cover of FIG. 14A.

Moreover, for example as shown in FIG. 14A and FIG. 14B, in a case where a cover 55 provided with a representation of a plurality of operation regions 55a, in which a pressing operation is possible, or members such as switches, is arranged on the operation panel 13A, the predetermined contact operation may be detected by a pressing operation being performed on one of the operation regions 55a among the plurality of operation regions 55a, and this operation region 55a making contact with a predetermined position on the operation panel 13A. In this case, by using a cover 55 that differs in the arrangement or the shape of the plurality of operation regions 55a, various switch operations become supportable.

Figure 15:
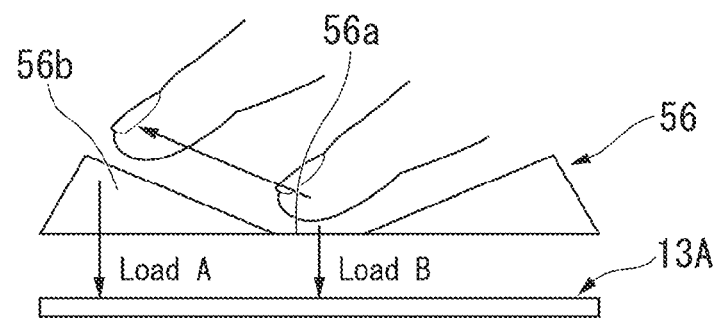
FIG. 15 is a drawing showing an example of a cover that is arranged on the operation panel of a vehicle operation device according to a modified example of the embodiment of the present invention.

Moreover, for example as shown in FIG. 15, in a case where a cover 56 having a concavoconvex shape is arranged on the operation panel 13A of the operation unit 13 comprising an elastic type or load type touch pad, and the like, then for example a load change or an elastic wave change is made to occur with respect to the movement of a finger resulting from a gesturing operation or the like, and the detection of gesturing operations such as a flick input, becomes possible.

For example, in the movement of the finger resulting from the gesturing operation shown in FIG. 15, the movement of the finger is detected by detecting changes in a load B at a region 56a of the cover 56, which has a thin thickness, and a load A at a region 56b of the cover 56, which has a thick thickness.

Figure 16A:
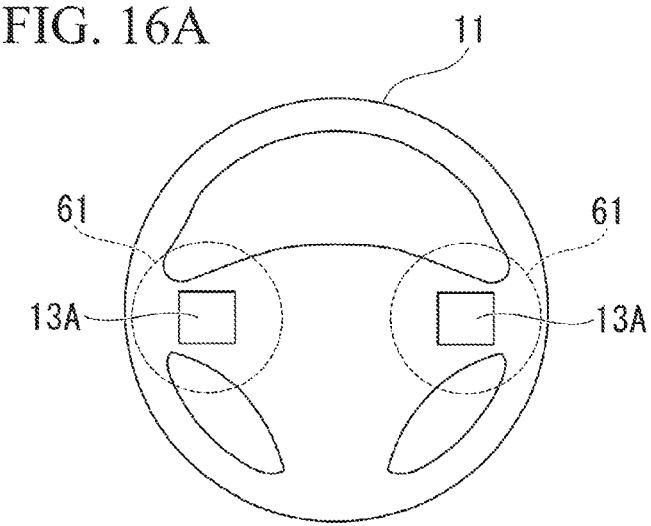
FIG. 16A is a drawing showing an example of a switching mechanism of a vehicle operation device according to a modified example of the embodiment of the present invention.
Figure 16B:
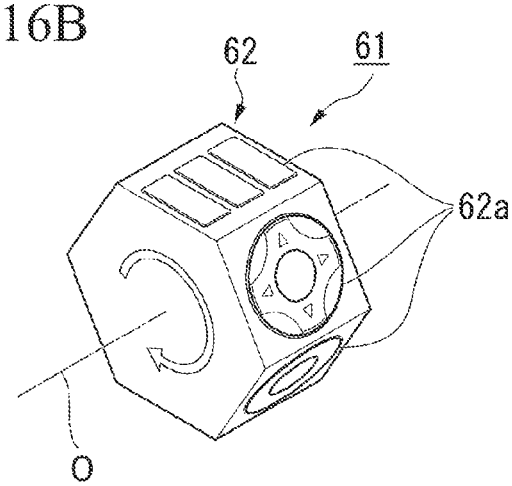
FIG. 16B is a drawing showing an example of a switching mechanism of the vehicle operation device according to the same modified example.

The switching mechanism 61 for selecting and switching the cover that is arranged on the operation panel 13A of the steering wheel 11 from among the plurality of covers is for example, as shown in FIG. 16A and FIG. 16B, configured such that a cover member 62 comprising a plurality of covers 62a, which are circularly arranged, is rotatable about the rotation axis O and is housed in the interior of the steering wheel 11, and accompanying the rotation of the cover member 62, one of the covers 62a among the plurality of covers 62a is exposed on the operation panel 13A.

Figure 16C:
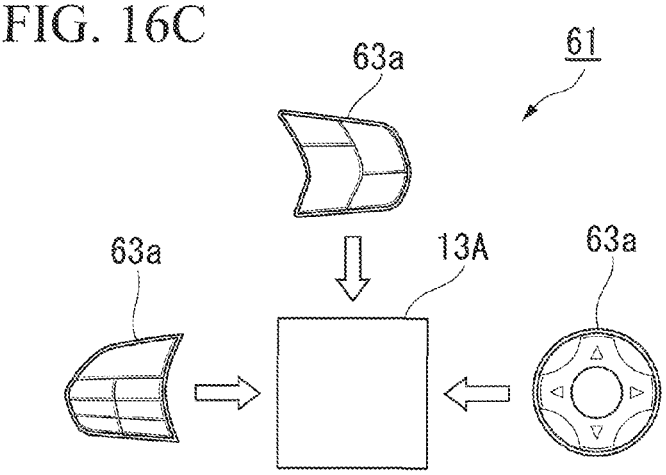
FIG. 16C is a drawing showing an example of a switching mechanism of the vehicle operation device according to the same modified example.

Furthermore, the switching mechanism 61 for selecting and switching the cover that is arranged on the operation panel 13A of the steering wheel 11 from among the plurality of covers is for example, as shown in FIG. 16A and FIG. 16C, configured such that a plurality of covers 63a are made slidingly movable in mutually different directions and are housed in the interior of the steering wheel 11, and by means of a sliding movement, one of the covers 63a among the plurality of covers 63a is exposed on the operation panel 13A.

In the embodiment mentioned above, the operation unit 13 is in no way limited to a touch pad, and for example, it may be a pointing device such as a trackball, a touch panel, or a joystick, in which a multi-directional input is possible, or an input device such as a force sensor, in which a multi-directional and pressing direction input are possible.

INDUSTRIAL APPLICABILITY

According to the present invention, a vehicle operation device in which it is possible to perform an appropriate display corresponding to an operation with respect to an operation panel provided on a steering wheel can be provided.

DESCRIPTION OF REFERENCE SYMBOLS

10 Vehicle operation device
11 Steering wheel
12 Grip part
13 Operation unit
13A Operation panel
14 Display device (display unit)
17 Steering angle sensor (steering angle detection device)
18 Speed sensor (travel state detection device)
21 Mode setting switch (travel state detection device)
31 Operation detection unit (operation detection device)
32 Operation finger detection unit (operation finger detection device)
33 Selection unit (selection device)
37 Correction unit (correction device)
38 Display control unit (display control device)
39 Correction prohibition unit (correction prohibition device)
41 Coordinate axis display (coordinate system display device)
42 Coordinate axis protrusion (coordinate system display device)
43 Arrow display (coordinate system display device)
44 Protrusion (coordinate system display device)

The invention claimed is:

1. A vehicle operation device provided with:
   a grip part that is provided on a steering wheel of a vehicle, and which is grippable by an operator;
   an operation unit provided on the grip part and that has an operation panel in which contact operations are possible by the fingers of the operator;
   an operation detection device that detects contact operations with respect to the operation panel by the fingers of the operator with a predetermined coordinate system that is set on the operation panel as a reference;
   a display unit in which an arrangement is fixed regardless of the rotation of the steering wheel;
   a display control device that controls the display of the display unit according to the contact operations detected by the operation detection device;
   a steering angle detection device that detects a steering angle of the steering wheel;
   a travel state detection device that detects a travel state of the vehicle;
   a correction device that corrects the coordinate system according to the steering angle detected by the steering angle detection device; and
   a correction prohibition device that, based on at least one from among the contact operations detected by the operation detection device, the steering angle detected by the steering angle detection device, and the travel state detected by the travel state detection device, prohibits correction of the coordinate system by the correction device even if the steering angle is more than a predetermined steering angle.

2. The vehicle operation device according to claim 1, wherein the correction prohibition device, in a case where steering with respect to the steering wheel is started during execution of the contact operation, which was started in a state in which steering with respect to the steering wheel was not executed, prohibits the correction of the coordinate system by the correction device.

3. The vehicle operation device according to claim 1, wherein there is further provided an operation finger detection device which detects a type of finger used for the contact operation and that is making contact with the operation panel; and
   the correction prohibition device, according to the type of finger detected by the operation finger detection device, prohibits correction of the coordinate system by the correction device.

4. The vehicle operation device according to claim 1, wherein the correction prohibition device, in a state in which the steering angle is more than the predetermined steering angle, releases prohibition of the correction in a case where a change of the steering angle over more than a predetermined time is less than a predetermined change, or in a case where a travel speed of the vehicle is less than a predetermined speed.

5. The vehicle operation device according to claim 1, wherein there is further provided a selection device whereby the operator is able to select whether or not to release prohibition of the correction by the correction prohibition device, and the correction prohibition device, in a case where the operator selects by means of the selection device release of prohibition of the correction by the correction prohibition device, releases prohibition of the correction.

6. The vehicle operation device according to claim 5, wherein there is provided a coordinate system display device that displays coordinate axis directions of the coordinate system on the operation panel.

7. The vehicle operation device according to claim 6, wherein the operation detection device changes a detectable region on the operation panel according to changes in the steering angle, and changes detection resolution according to the size of the change of the detectable region.

* * * * *